(12) United States Patent
Chen et al.

(10) Patent No.: US 11,044,262 B2
(45) Date of Patent: Jun. 22, 2021

(54) METHOD, APPARATUS AND SYSTEM FOR ANTI-ATTACKING IN DOMAIN NAME SYSTEM (DNS)

(71) Applicant: WANGSU SCIENCE & TECHNOLOGY CO., LTD., Shanghai (CN)

(72) Inventors: Danjiang Chen, Shanghai (CN); Zaibin Li, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 260 days.

(21) Appl. No.: 16/464,761

(22) PCT Filed: Feb. 28, 2018

(86) PCT No.: PCT/CN2018/077553
§ 371 (c)(1),
(2) Date: May 29, 2019

(87) PCT Pub. No.: WO2018/233312
PCT Pub. Date: Dec. 27, 2018

(65) Prior Publication Data
US 2019/0394217 A1    Dec. 26, 2019

(30) Foreign Application Priority Data
Jun. 23, 2017   (CN) .......................... 201710488513.5

(51) Int. Cl.
*G06F 15/16* (2006.01)
*H04L 29/06* (2006.01)
(Continued)

(52) U.S. Cl.
CPC ...... *H04L 63/1416* (2013.01); *H04L 61/1511* (2013.01); *H04L 63/1458* (2013.01); *H04L 67/2842* (2013.01)

(58) Field of Classification Search
CPC ............. H04L 63/1416; H04L 63/1458; H04L 61/1511; H04L 67/2842
(Continued)

(56) References Cited

U.S. PATENT DOCUMENTS 8,972,580 B2 *  3/2015  Fleischman ............. H04L 69/40
                                                    709/226
9,426,171 B1 *  8/2016  Jezorek ................... H04L 67/42
(Continued)

FOREIGN PATENT DOCUMENTS

CN    103685599 A    3/2014
CN    105357328 A    2/2016
(Continued)

OTHER PUBLICATIONS

The European Patent Office (EPO) the Extended European Search Report for 18820776.5 Jan. 20, 2020 8 Pages.
(Continued)

*Primary Examiner* — Khanh Q Dinh
(74) *Attorney, Agent, or Firm* — Anova Law Group, PLLC

(57) ABSTRACT

The present invention provides a DNS anti-attacking method, including receiving a domain name search request message by a recursive server; determining a first authoritative domain name server according to the first NS record and the A record of the first NS corresponding to the domain name and sending a domain name search request message to the first authoritative domain name server by the recursive server; receiving the A record of the domain name, a second NS record and an A record of the second NS returned from
(Continued)

the first authoritative domain name server by the recursive server, wherein the second NS record records the authoritative domain name server used to parse the domain name and working at the normal status; and substituting the first NS record with the second NS record and caching the A record of the second NS by the recursive server.

16 Claims, 4 Drawing Sheets

(51) Int. Cl.
    *H04L 29/12*    (2006.01)
    *H04L 29/08*    (2006.01)
(58) Field of Classification Search
    USPC .......................... 709/220, 224, 226, 228, 232
    See application file for complete search history.

(56) References Cited

U.S. PATENT DOCUMENTS

| | | | | |
|---|---|---|---|---|
| 10,530,734 | B2* | 1/2020 | Kaliski, Jr. | H04L 67/30 |
| 10,554,697 | B1* | 2/2020 | Ledet | H04L 65/1069 |
| 10,686,751 | B2* | 6/2020 | Linari | H04L 29/06 |
| 10,805,190 | B2* | 10/2020 | Kaliski, Jr. | H04L 43/062 |
| 2009/0164661 | A1 | 6/2009 | Kim et al. | |
| 2014/0129699 | A1 | 5/2014 | Jeftovle et al. | |
| 2015/0256424 | A1* | 9/2015 | Kaliski, Jr. | H04L 43/062 709/224 |
| 2016/0173439 | A1* | 6/2016 | Kaliski, Jr. | H04L 61/10 709/245 |
| 2017/0041321 | A1* | 2/2017 | Tan | H04L 61/1552 |
| 2018/0270161 | A1* | 9/2018 | Popescu | H04L 43/0864 |
| 2019/0097465 | A1* | 3/2019 | Zeine | H02J 50/80 |

FOREIGN PATENT DOCUMENTS

| | | |
|---|---|---|
| CN | 106209832 A | 12/2016 |
| CN | 106375492 A | 2/2017 |
| CN | 107222492 A | 9/2017 |

OTHER PUBLICATIONS

Zheng Wang et al :"Optimizing DNS Server Selection". Applied Mathematics & Information Sciences vol. 7, No. 6, Nov. 1, 2013 pp. 2233-2240.

The World Intellectual Property Organization (WIPO). International Search Report and Written Opinion for PCT/CN2018/077553 Jan. 6, 2018 10 Pages.

* cited by examiner

METHOD, APPARATUS AND SYSTEM FOR ANTI-ATTACKING IN DOMAIN NAME SYSTEM (DNS)

CROSS-REFERENCE TO RELATED APPLICATIONS

This application is a national phase entry under 35 U.S.C. § 371 of International Application No. PCT/CN2018/077553, filed on Feb. 28, 2018, which claims the priority and benefits of Chinese Patent Application Serial No. CN2017104885135, filed with the State Intellectual Property Office of P. R. China on Jun. 23, 2017, the entire content of all of which is incorporated herein by reference.

FIELD OF THE TECHNOLOGY

The present disclosure generally relates to the field of network security technologies and, more particularly, relates to methods, apparatus and systems for anti-attacking in domain name system (DNS).

BACKGROUND OF THE TECHNOLOGY

Currently, the cyber-attacks on the Internet have become increasingly frequent; and the forms of attacks have become increasingly diversified. Among those attacks, the large-scale distributed-denial of service (DdoS) attack directed against domain name system (DNS) server is the most severe one.

When a client accesses a domain name, for example, accesses aaa.com, the address (A) of aaa.com is queried to a recursive server. If the recursive server has not cached the address (A) of aaa.com, the recursive server will recursively query the root domain name server (.), the top-level domain name server (.com), and the authoritative domain name server (aaa.com) for the corresponding A record. The top-level domain name server (.com) will not directly tell the corresponding A record of aaa.com, but send the name server (NS) record corresponding to the authoritative domain (aaa.com) to the recursive server. The NS record stores all the NS records of the authoritative domain used to parse aaa.com, for example:

| aaa.com. | 172800 IN | NS | ns1.aaadns.com. |
|---|---|---|---|
| aaa.com. | 172800 IN | NS | ns2.aaadns.com. |
| aaa.com. | 172800 IN | NS | ns3.aaadns.com. |
| aaa.com. | 172800 IN | NS | ns4.aaadns.com.; | and
the A record stored by the NS record of the authoritative domain server, for example:

| ns1.aaadns.com. | 172800 IN | A | 1.1.1.1 |
|---|---|---|---|
| ns2.aaadns.com. | 172800 IN | A | 2.2.2.2 |
| ns3.aaadns.com. | 172800 IN | A | 3.3.3.3 |
| ns4.aaadns.com. | 172800 IN | A | 4.4.4.4 |

Then, the recursive server selects one of the authoritative domain servers to access, for example:

| aaa.com. | 172800 IN | NS | ns1.aaadns.com. |
|---|---|---|---|
| ns1.aaadns.com. | 172800 IN | A | 1.1.1.1 |

The recursive server sends a domain name access inquiry to the authoritative domain server 1.1.1.1 to obtain the A record corresponding to aaa.com. Then, the authoritative domain server 1.1.1.1 returns the A record corresponding to aaa.com to the recursive server to finish a complete domain name resolution, such as aaa.com, 600 IN A, and 106.11.61.44.

Finally, the client accesses the domain name aaa.com according to the IP address 106.11.61.44 corresponding to aaa.com.

The recursive server subsequently selects the authoritative domain server 1.1.1.1 as the priority server for parsing domain names having a similar type with aaa.com. If the authoritative domain server 1.1.1.1 is attacked, since the NS Time To Live (TTL) is generally mandatorily regulated as 48 hours by the top-level domain authority mechanism (ns1.aaadns.com), a large number of domain names cannot be parsed within a long time. Thus, the efficiency of the domain name parsing is reduced.

BRIEF SUMMARY OF THE INVENTION

Embodiments of the present invention provides methods, apparatus and systems for anti-attacking in domain name system (DNS) to solve technical problems on how to increase efficiency for parsing the domain name when an authoritative domain name server is attacked.

The present invention provides a DNS anti-attacking method, the method includes:

receiving by a recursive server a domain name search request message, wherein the domain name server request message may contain a domain name that is un-cached the recursive server;

determining by the recursive server a first authoritative domain name server according to a first name server (NS) record and an address (A) record of a first name server (NS) corresponding to the domain name and sending by the recursive server the domain name search request message to the first authoritative domain name server;

receiving by the recursive server the A record of the domain name, a second NS record and an A record of the second NS returned by the first authoritative domain name server, wherein the second NS record may record the authoritative domain name server that used to parse the domain name and is at a normal working status; and substituting by the recursive server the first NS record with the second NS record and caches the A record of the second NS.

Optionally, before the recursive server determines the first authoritative domain name server according to the first NS record and the A record of the first NS corresponding to the domain name, the method further includes:

determining the recursive server a second authoritative domain name server according to the first NS record and the A record of the first NS corresponding to the domain name, wherein the second authoritative domain name server is an authoritative domain name server of a type of domain names similar with a parsed domain name that is recorded in the recursive server; and determining by the recursive server the first authoritative domain name server according to the first NS record and the A record of the first NS corresponding to the domain name when the recursive server does not receive the message returned by the second authoritative domain name server, wherein the second NS record does not include the second authoritative domain name server.

Optionally, the step for the recursive server to substitute the first NS record with the second NS record and caches the A record of the second NS includes:

substituting by the recursive server the first NS record with the second NS record and caches the A record of the second NS when the recursive server determines that the second NS record is different from the first NS record.

Optionally, the A record of the first NS and the A record of the second NS both utilize the method of Extensive domain name directing to IP address; and for each A information in the A record of the first NS record and the A record of the second NS record, the authoritative domain name server corresponding to the A record in the NS records falls within a matching range of the A information.

Optionally, the first authoritative domain name server receives the domain name search request message sent from the recursive server, wherein the domain name search request message may contain domain name that is un-cached in the recursive server; the recursive server determines a first authoritative domain name server according to the first NS record and the A record of the first NS record; and the first authoritative domain name server sends the A record of the domain name, a second NS record and the A record of the second NS to the recursive server, wherein the second NS record may contain the information of the authoritative domain name server that is used to parse the domain name and is at the normal working condition.

Optionally, the second NS record and the A record of the second NS are obtained by:

deleting by the first authoritative domain name server the information of the domain name server that is an abnormal working status in the first NS record and the A record of the first NS; or substituting by the first authoritative domain name server the information of the domain name server that is at the abnormal working status in the first NS record and the A record of the first NS with the information of a newly added domain name server that is used to parse the domain name.

Optionally, an upper level domain name server of the first authoritative domain name server is allocated with the second NS record and the A record of the second NS.

Correspondingly, the present invention provides a recursive sever. The recursive server includes:

a memory, configured to store program commands; and a processor, configured to call the program commands stored in the memory and according to the obtained program commands to execute following steps: receiving by the recursive server a domain name search request message; determining the recursive server a first authoritative domain name server according to the first NS record and the A record of the first NS corresponding to the domain name and sending a domain name search request message to the first authoritative domain name server; receiving by the recursive server the A record of the domain name, a second NS record and an A record of the second NS returned by the first authoritative domain name server, wherein the second NS record may record the authoritative domain name server that is used to parse the domain name and is at the normal working status; and substituting by the recursive server the first NS record with the second NS record and caching the A record of the second NS.

The present invention also provides an authoritative domain name sever. The authoritative domain name sever includes:

a memory, configured to store program commands; and a processor, configured to call the program commands stored in the memory and according to the obtained program commands to execute following steps: receiving by the first authoritative domain name server the domain name search request message sent from the recursive server, wherein the domain name search request message may contain the domain name that is un-cached in the recursive server; determining by the recursive server a first authoritative domain name server according to the first NS record and the A record of the first NS record; and sending by the first authoritative domain name server the A record of the domain name, a second NS record and the A record of the second NS to the recursive server, wherein the second NS record may contain the information of the authoritative domain name server that is used to parse the domain name and is at the normal working condition.

The present invention also provides a computer storage medium. The computer storage medium stores the computer executable commands used to enable the computer to execute any one of the above methods.

The present invention also provides a DNS anti-attacking system including the above recursive server and the authoritative domain name server.

In the disclosed methods, apparatus and systems for anti-attacking in DNS, the recursive server may search the first NS and the A record of the first NS corresponding to the non-parsed domain names. The first NS may record the authoritative domain name server used to parse the domain name; the recursive server may determine a first authoritative domain name server according to the first NS record. The first authoritative domain name server may not only return the A record of the domain name, but also return the second NS record and the A record of the second NS stored in the first authoritative domain name server. The second NS record may record the authoritative domain name server that is used to parse the domain name and is at the normal working status. The recursive server may substitute the first NS record with the second NS record and cache the A record of the second NS. It can be seen that the recursive server may utilize the first NS record stored in itself to determine the first authoritative domain name server that is used to parse the domain name, and then update the first NS record with the second NS record returned from the first authoritative domain name server that is at the normal working status. Thus, the information of the attacked authoritative domain name server or the authoritative domain name server working the abnormal status may be deleted from the NS record. Accordingly, the TTL value mandatorily allocated by the top-level authority may not cause a long time effect to the DNS parsing. Thus, the efficiency for parsing the domain name may be increased.

BRIEF DESCRIPTION OF THE DRAWINGS

To more clearly illustrate the technical solutions in the embodiments of the present invention, the accompanying drawings required for describing the embodiments used in embodiments will be described briefly.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Embodiment 1

Figure 1:
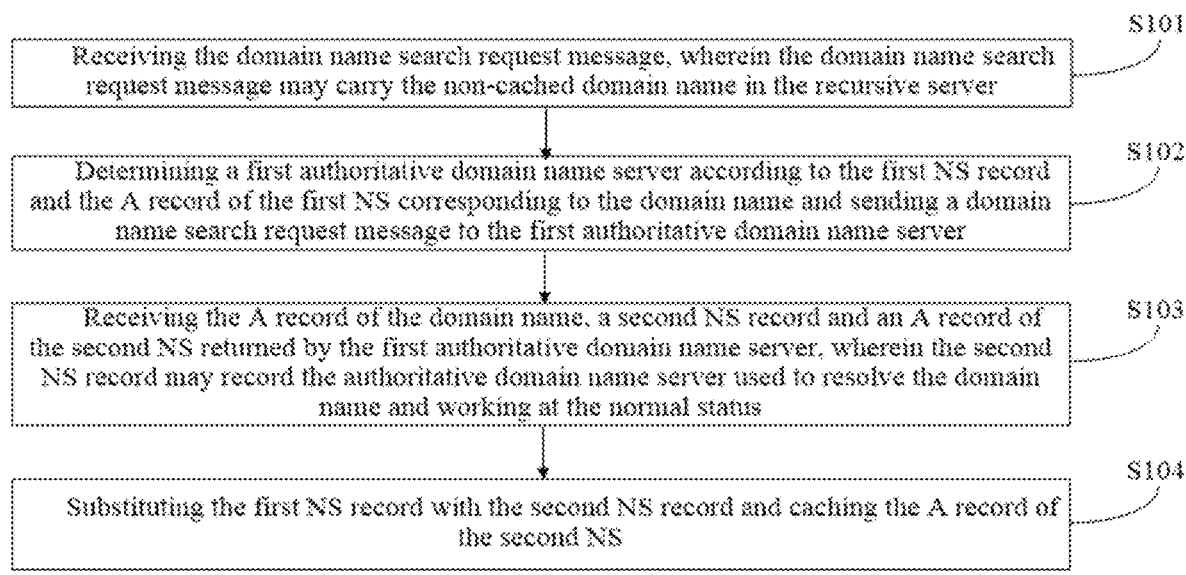
FIG. 1 is a flow chart of a first exemplary DNS anti-attacking method according to various disclosed embodiments.

FIG. 1 is a flow chart of a first exemplary DNS anti-attacking method according to various disclosed embodiments. As shown in FIG. 1, the method may include following steps.

Step S101, the recursive server receives the domain name search request message. The domain name search request message may contain a domain name that is un-cached in the recursive server.

After the recursive server receives the domain name search request message, whether the IP address information of the domain name corresponding to the domain name search request massage is cached may be determined. If the IP address information of the domain name corresponding to the domain name search request massage is cached, the IP address information of the domain name corresponding to the domain name search request massage may be directly returned to the client. If the IP address information of the domain name corresponding to the domain name search request massage is un-cached, an authoritative domain name server that is used for parsing the domain name may be determined according to the NS record corresponding to the domain name.

For example, if the client wants to access www.ddd.com, the recursive server of the client may cache the corresponding IP address of www.ddd.com, the recursive server may send the corresponding IP address of www.ddd.com to the client. In another condition, if the recursive server of the client does not cache the corresponding IP address of www.ddd.com, the first NS record and the A record of the first NS corresponding to the domain name search request message www.ddd.com may be determined by a recursive query or the NS record and the A record of the NS cached by the recursive server. That is, the NS record and the A record of the NS used to parse the domain name www.ddd.com may be obtained.

Step S102, the recursive server may determine a first authoritative domain name server according to the first NS record and the A record of the first NS corresponding to the domain name; and send a domain name search request message to the first authoritative domain name server.

The first NS record may often record a plurality of authoritative domain name servers for parsing the domain name. The recursive server may randomly select one authoritative domain name server. Usually, if the recursive server parse a similar type of domain names before using a certain authoritative domain name server (e.g., a second authoritative domain name server), the recursive server may often select the second authoritative domain name server as a primary domain name server. For example, the to-be-parsed domain name is example.aaa.com, the second authoritative domain name server has parsed a domain name xxx.aaa.com before, when parsing the domain name example.aaa.com, the recursive server will send the domain name search request message to the second authoritative domain name server. If the recursive server does not receive the message returned from the second authoritative domain name server, the recursive server may determine another authoritative domain name server (e.g., a first authoritative domain name server) to parse the domain name according to the first NS record and the A record of the first NS. Taking example.aaa.com and xxx.aaa.com as examples, both take aaa.com as secondary domain names, and the upper level domain name, the lower level domain name and the same level domain name are often classified as a similar type of domain names. The similar type of domain names may often correspond to a same group of authoritative domain name servers.

Step S103, the first authoritative domain name server may return the A record of the domain name, a second NS record and an A record of the second NS record to the recursive server. The second NS record may record the authoritative domain name server that is used to parse the domain name and is at the normal working status.

When the first authoritative domain name server works at the normal status, the first authoritative domain name server may return the A record of the parsed domain name. Further, the first authoritative domain name server may also return the second NS record and the A record of the second NS. The second NS record may record the authoritative domain name server working at the normal status. The content of the second NS record may be mutually detected by each of the authoritative domain name servers by a mechanism including a heartbeat message, etc., or by updating the content of the NS record according to the alert message, or by artificially setting up. Taking example.aaa.com as an example, the initial information stored in each of the authoritative domain name servers may be the NS information filled when aaa.com is registered. With the status of the authoritative domain name servers corresponding to aaa.com is changed, each of the authoritative domain name servers may update the NS record and the A record of the NS corresponding to aaa.com stored in the corresponding authoritative domain name server. For example, when the second authoritative domain name server is attacked by the distributed denial of service (DdoS), each of other authoritative domain name servers that is working at the normal status may delete the information of the second authoritative domain name server from the NS record stored in themselves, and the A record of the second authoritative domain name server may not just be modified. Thus, the NS record may be refreshed to obtain a second NS record. The second NS record may be the information of the authoritative domain name server that is at the normal working status and recorded in the first NS record, or may include a new third authoritative domain name server. Optionally, the present invention may also provide a method for obtaining the second NS record and the A record of the second NS.

The method for obtaining the second NS record and the A record of the second NS may include that the first authoritative domain name server deletes the information of the domain name server that is at an abnormal working status in the first NS record, or the first authoritative domain name server may substitute the information of the domain name server that is at the abnormal working status in the first NS record and the A record of the first NS with the information of the newly added domain name server that is used to parse the domain name.

Step S104, the recursive server may substitute the first NS record with the second NS record and cache the A record of the second NS.

Because the information of the authoritative domain name server that is at the abnormal working status in the second NS record may be deleted, the recursive server may update the first NS record through the second NS. Thus, the information of the attacked authoritative domain name server or the authoritative domain name server that is at the abnormal working status may be deleted from the NS record. Accordingly, the long time issue of the DNS parsing in the existing technologies caused by that the top-level domain authority mandatorily regulates the TTL value may be avoided. Further, the issue that the recursive server is unable to refresh the NS record caused by only modifying the A record of the authoritative domain name server that is at the abnormal working status may be avoided.

In step S104, the second NS record and the first NS record received by the recursive server may be same. One approach to perform the Step S104 may be that the recursive server performs a direct updating according to the second NS record. Another approach is that, when the recursive server determines that the second NS record is different from the first NS record, the first NS record may be substituted by the second NS record and the A record of the second NS may be cached.

Optionally, the time to live (TTL) in the first NS record may be mandatorily regulated as 172800 seconds, i.e., 48 hours, by the top-level authority; and cannot be modified. In the disclosed embodiment, because the NS record may be obtained from the authoritative domain name server, the TTL in the second NS record may be variable. In the practical application, the TTL of each of the authoritative domain name servers may be set according to the specific needs. In one embodiment, TTL<172800 seconds. In the disclosed embodiment, not the NS record filled in the top-level domain name when registering the domain name but the NS record set by the authoritative domain name server itself is utilized to provide a more precise domain name resolution/parsing for the client.

Embodiment 2

In the following specific example, the access flow when each of the authoritative domain name servers in the first NS record is not attacked will be described in detail.

Figure 2:
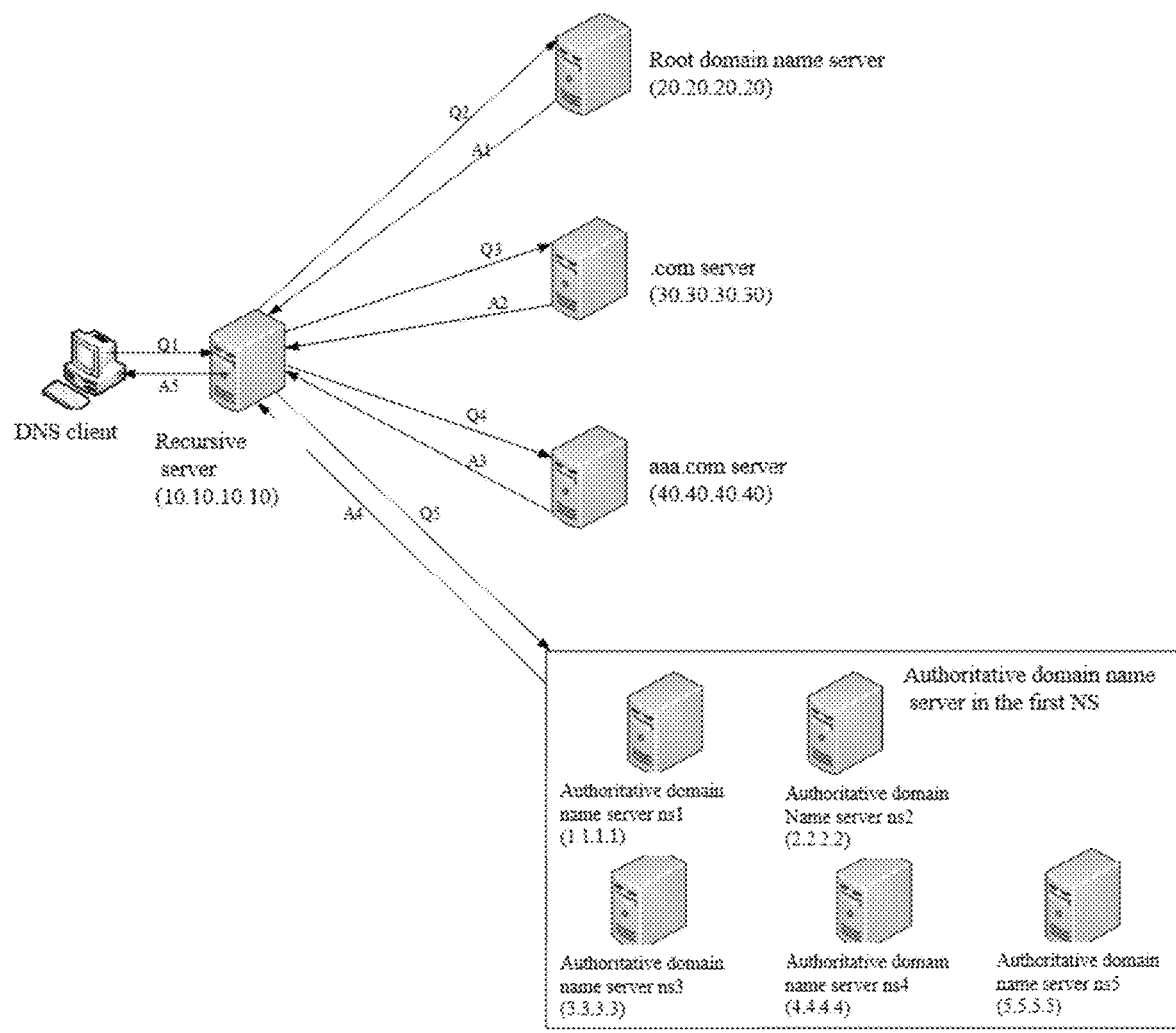
FIG. 2 is a flow chart of a second exemplary DNS anti-attacking method according to various disclosed embodiments.

As shown in FIG. 2, one can suppose that the client wants to access its own non-cached website example.aaa.com; and the IP address of the recursive server configured by the client is 10.10.10.10. The IP address of the root domain name server allocated on the recursive server is 20.20.20.20. The entire recursive resolution process is illustrated in FIG. 2 (Q1-Q5 illustrates sending DNS searching inquiry; and A1-A5 illustrates DNS searching response). The specific flow is as following.

(1) The DNS client may send a DNS request message for parsing the domain name example.aaa.com to an allocated recursive server (IP address: 10.10.10.10) (Q1 in FIG. 2). It may be equivalent that the recursive server says: "please give me the IP address corresponding to example.aaa.com".

(2) After the recursive server receives the inquiry, the local cache may be searched. If no record corresponding to the domain name is found, the recursive server may send the DNS request message for parsing the domain name example.aaa.com to the allocated root domain name server (IP address: 20.20.20.20) (Q2 in FIG. 2).

(3) After receiving the searching request, the root domain name server may obtain the IP address of the top-level domain name server corresponding to the .com top-level domain name by searching, which is 30.30.30.30. Then, a response message may be returned to the recursive server (A1 in FIG. 2). It be equivalent that "I do not know the IP address corresponding to the domain name example.aaa.com, but I tell you now that the IP address of the top-level domain name corresponding to domain name .com is 30.30.30.30".

In the practical applications, the root domain name server may not only search the IP address of the top-level domain name corresponding to domain name .com, but also find the IP address of the top-level domain name corresponding to domain name .uk, the IP address of the top-level domain name corresponding to a domain name .cn, and the IP address of the top-level domain name corresponding to a domain name .org, etc.

(4) After receiving the DNS response message of the root domain name server and obtaining the IP address 30.30.30.30 of the top-level domain name server corresponding to .com, the recursive server may send a DNS request message for parsing the domain name example.aaa.com to the corresponding top level domain name server one more time (Q3 in FIG. 2).

(5) After receiving the DNS response message, the .com top level domain name server may search its own cache. If there is no record of the domain name, the secondary domain name corresponding to aaa.com may be searched, and then a DNS response message may be returned to the recursive sever (A3 in FIG. 2). It be equivalent that "I do not know the IP address corresponding to the domain name example.aaa.com, but I tell you now that the IP address of the authoritative domain server corresponding to the domain name aaa.com is 40.40.40.40".

(6) After receiving the DNS response message of the .com top level domain name server and obtaining the IP address 40.40.40.40 of the authoritative name server corresponding to aaa.com, the recursive server may send a DNS request message for parsing the domain name example.aaa.com to the corresponding authoritative domain name server one more time (Q4 in FIG. 2).

(7) After receiving the DNS response message, the aaa.com authoritative domain name server may search its own cache first. If there is no record of the domain name, the filled NS record of example. aaa.com during the registration of the top level domain may be sent to the recursive server. The filled NS record of example. aaa.com during the registration of the top level domain may be assumed as following:

| aaa.com. | 172800 IN | NS | ns1.aaa.com |
| aaa.com. | 172800 IN | NS | ns2.aaa.com |
| aaa.com. | 172800 IN | NS | ns3.aaa.com |
| aaa.com. | 172800 IN | NS | ns4.aaa.com |
| aaa.com. | 172800 IN | NS | ns5.aaa.com; | and
the A record of the first NS may be as following:

| ns1.aaa.com | 172800 IN | A | 1.1.1.1 |
| ns2.aaa.com | 172800 IN | A | 2.2.2.2 |
| ns3.aaa.com | 172800 IN | A | 3.3.3.3 |
| ns4.aaa.com | 172800 IN | A | 4.4.4.4 |
| ns5.aaa.com | 172800 IN | A | 5.5.5.5 |

The first NS record may also be pre-stored in all the authoritative servers. The authoritative domain name server with the IP address 1.1.1.1 may store the first NS record; the authoritative domain name server with the IP address 2.2.2.2 may also store the first NS record; the authoritative domain name server with the IP address 3.3.3.3 may also store the first NS record; the authoritative domain name server with the IP address 4.4.4.4 may also store the first NS record; and the authoritative domain name server with the IP address 5.5.5.5 may also store the first NS record.

(8) After receiving the first NS record returned form the aaa.com authoritative domain name server, the recursive server may visit any of the authoritative domain name servers in the first NS record according to the first NS record. For example, the recursive server may visit the authoritative domain name server ns1 with the IP address of 1.1.1.1.

(9) The recursive server may obtain the IP address corresponding to example.aaa.com according to the authoritative domain name server ns1 with the IP address of 1.1.1.1. If the IP address of example.aaa.com in the authoritative domain name server ns1 is 8.8.8.8, the authoritative domain name server ns1 may send the second NS record and the A record of the second NS pre-stored in the authoritative domain name server ns1 (because no authoritative domain name sever was found to be attacked or to be at the abnormal working status) and the corresponding IP address of 8.8.8.8 together to the recursive server.

(10) After receiving the IP address of 8.8.8.8 corresponding to example.aaa.com returned from the authoritative domain name server ns1, the recursive server may return the IP address of 8.8.8.8 corresponding to example.aaa.com to the client (A5 in FIG. 2)

Embodiment 3

When the authoritative domain name server is under attacked, the attacked authoritative domain name server may be deleted to recover to the normal parsing status.

Based on the second embodiment, the visiting flow when an authoritative domain name server in the first NS record is attacked is described as following.

For example, when the authoritative domain name server ns1 with the IP address of 1.1.1.1 in the first NS record is attacked, other authoritative domain name servers that are at the normal working status (ns2, ns3, ns4 and ns5) may modify the self-stored NS records; and delete the authoritative domain name server ns1 with the IP address of 1.1.1.1 to obtain a second NS record as following:

| aaa.com. | 172800 IN | NS | ns2.aaa.com |
| --- | --- | --- | --- |
| aaa.com. | 172800 IN | NS | ns3.aaa.com |
| aaa.com. | 172800 IN | NS | ns4.aaa.com |
| aaa.com. | 172800 IN | NS | ns5.aaa.com |

Optionally, the upper level domain name server of the authoritative domain name servers (ns1, ns2, ns3, ns4 and ns5) may also update the self-stored NS records to ensure to the accuracy of the NS record and the A record of the NS obtained by the upper level domain name server. For example, the client 1 may parse the domain name of example.aaa.com by the first recursive server 1, when the NS record of the authoritative domain name server of aaa.com is changed (e.g., changed from ns1, ns2, ns3, ns4 and ns5 to ns2, ns3, ns4 and ns5), the authoritative domain name servers corresponding to ns2, ns3, ns4 and ns5 and the NS record corresponding to recursive server 1 may be updated. That is, now the authoritative domain name servers working at the normal condition are ns2, ns3, ns4 and ns5. The client 2 may parse the domain name of the example.aaa.com using a recursive domain name server 2. If the NS record of the upper level domain name server is not updated, the NS record obtained by the second recursive domain name server 2 may still include the ns1 working at the abnormal status. Thus, the present disclosed embodiment also provides a method for updating the upper level domain name server to ensure the recursive server to obtain a valid NS record.

For the A record corresponding to the NS record, it may be modified, i.e., deleting the A record of ns1, or it may not be modified. When the A record is not deleted, because there is no ns1 in the NS record, the A record may not be affected even there is A record of the ns1 in the A record, it may be automatically deleted by the end of the life time. Optionally, the A record corresponding to the second NS record may be:

| ns2.aaa.com | 172800 IN | A | 2.2.2.2 |
| --- | --- | --- | --- |
| ns3.aaa.com | 172800 IN | A | 3.3.3.3 |
| ns4.aaa.com | 172800 IN | A | 4.4.4.4 |
| ns5.aaa.com | 172800 IN | A | 5.5.5.5 |

Figure 3:
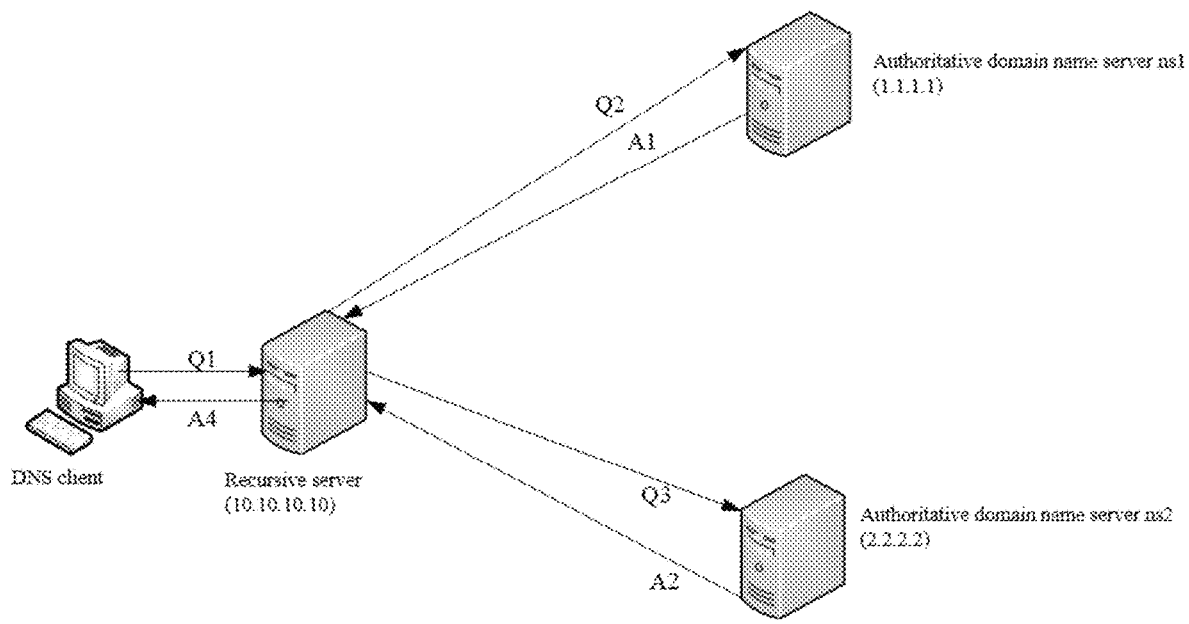
FIG. 3 is a flow chart of a third exemplary DNS anti-attacking method according to various disclosed embodiments.

As shown in FIG. 3:

(1) The DNS client may visit the website: example1.aaa.com for the first time, the DNS client may send a domain name request message for parsing the domain name example1.aaa.com to an allocated recursive server (IP address: 10.10.10.10) (Q1 in FIG. 3). It may be equivalent that the recursive server says: "please give me the IP address corresponding to example1.aaa.com".

(2) After the recursive server receives the inquiry, the local cache may be searched. Because, the recursive server may have returned the domain name resolution result, the recursive server may determine the to-be-parsed authoritative domain name server according to the NS record in the cache. The previous domain name resolution may be done by the authoritative domain name server ns1, the recursive server may send the message for parsing the authoritative domain name server ns1 having the IP address of 1.1.1.1 (Q2 in FIG. 3).

(3) Because the authoritative domain name server ns1 is attacked and may work at an abnormal status; and it is unable to provide service to the recursive server, the recursive server may not receive resolution result returned by the ns1 after a while (A1 in FIG. 3). Thus, the recursive server may determine a new authoritative domain name server according to the first NS record. If the newly selected authoritative domain name server still works at the abnormal status, the recursive server may continue to search until an authoritative domain name server that is able provide the domain name resolution is found.

(4) When the recursive server selects ns2, the domain name search request message may be sent to ns2 with the IP address of 2.2.2.2 (Q3 in FIG. 3).

(5) ns2 may work at a normal status, and may perform a domain name resolution to example1.aaa.com in the domain name search request information; and the corresponding IP address may be obtained. For example, when the corresponding IP address of example1.aaa.com is 9.9.9.9, ns2 may send the IP address of 9.9.9.9 corresponding to example1.aaa.com to the recursive server and send the second NS record and the A record corresponding to the second NS record stored in itself to the recursive server (A2 in FIG. 3).

(6) After receiving the second NS record returned from the authoritative domain name server ns2, the recursive server may determine if the second NS record is the same as the first NS record. If the second NS record is found to be different from the first NS record, the first NS record may be substituted with the second NS record.

Now, the first NS record may be as following:

| aaa.com. | 172800 IN | NS | ns1.aaa.com |
| aaa.com. | 172800 IN | NS | ns2.aaa.com |
| aaa.com. | 172800 IN | NS | ns3.aaa.com |
| aaa.com. | 172800 IN | NS | ns4.aaa.com |
| aaa.com. | 172800 IN | NS | ns5.aaa.com, | while the second NS record may be as following:

| aaa.com. | 172800 IN | NS | ns2.aaa.com |
| aaa.com. | 172800 IN | NS | ns3.aaa.com |
| aaa.com. | 172800 IN | NS | ns4.aaa.com |
| aaa.com. | 172800 IN | NS | ns5.aaa.com |

It can be seen that the second NS record is different from the first NS record. Thus, the first NS record may be substituted with the second NS record. When other similar domain names, such as xxx.aaa.com, etc. send the request for parsing the domain name again to the recursive server, because the NS record of the attacked ns1 is cached in the recursive server, the authoritative server and the upper level domain name server of the authoritative domain name server may be deleted, xxx.aaa.com may not be guided to the attacked ns1, but ns2, ns3, ns4, and ns5 that is in the second NS record and is at the normal working status may be in charge of the parsing process; and the effect of the attacked ns1 to the domain name resolution may be timely eliminated.

(7) The recursive server may return the IP address of 9.9.9.9 corresponding to examples.aaa.com returned by ns2 to the DNS client (A4 in FIG. 3).

Embodiment 4

When the authoritative domain name server is under attacked, to prevent the effect to the tasks, the attack may be prevented by adding an authoritative domain name server to substitute the attacked authoritative domain name server.

Based on the third embodiment, when the authoritative domain name server having the IP address of 1.1.1.1 in the first NS record is detected to be attacked, the authoritative domain name server ns1 having the IP address of 1.1.1.1 in the first NS record of each of the authoritative domain name servers may be deleted. At the same time, to ensure to perform the tasks normally, a new authoritative domain name server ns6 may be added in the domain name server system. Accordingly, each of the authoritative domain name servers, and the upper level domain name server of each of the authoritative domain name servers may need to update the NS record stored in themselves. That is, the information of ns1 in the first NS may be deleted; and the information of ns6 may be added.

In particular, the authoritative domain name server ns6 having the IP address of 6.6.6.6 may be added by writing following codes:

| aaa.com | 600 IN | NS | ns6.aaa.com |
| ns6.aaa.com | 7200 IN | A | 6.6.6.6 |

After deleting ns1 and adding ns 6 in the authoritative domain name servers, the NS record stored in all the authoritative domain name servers working at the normal status may be the second NS record as following:

| aaa.com. | 172800 IN | NS | ns2.aaa.com |
| aaa.com. | 172800 IN | NS | ns3.aaa.com |
| aaa.com. | 172800 IN | NS | ns4.aaa.com |
| aaa.com. | 172800 IN | NS | ns5.aaa.com |
| aaa.com. | 7200 IN | NS | ns6.aaa.com; | and the A record corresponding to the second NS record is:

| ns6.aaa.com | 7200 IN | A | 6.6.6.6 |
| ns2.aaa.com | 172800 IN | A | 2.2.2.2 |
| ns3.aaa.com | 172800 IN | A | 3.3.3.3 |
| ns4.aaa.com | 172800 IN | A | 4.4.4.4 |
| ns5.aaa.com | 172800 IN | A | 5.5.5.5 |

It can be seen that the information of the new ns6 in the second NS record may not be allocated by the top-level domain name server. Thus, its life time may be self-determined. Accordingly, the updating time of the NS record of the recursive server may be more flexible; and the updating time may be reduced.

Similarly, when other similar domain names, such as xxx.aaa.com, etc. send the request for parsing the domain name again to the recursive server, because the NS record of the attacked ns1 may be cached in the recursive server, the authoritative server and the upper level domain name server of the authoritative domain name server may be substituted by ns6 that at the normal working status, xxx.aaa.com may not be guided to the attacked ns1, but ns2, ns3, ns4, and ns5 that in the second NS record and are at the normal working status may be in charge of the parsing process; and the effect of the attacked ns1 to the domain name resolution may be timely eliminated.

Embodiment 5

Base on the previously described embodiments, if the newly added authoritative domain name server substitutes the authoritative domain name server that is at the abnormal working status, updating the NS record may relate to two times of modifications to the names of the authoritative domain name server. For example, if the information of ns1 that is at the abnormal working status in the first NS record is substituted with ns6, it may need to change the ns1 in the two records of the ns1 in the first NS1 to ns6 (the content in the parenthesis in the following example is the one after the modification):

| aaa.com. | 172800 IN | NS | ns1 (ns6) .aaa.com |
| ns1 (ns6) .aaa.com | 172800 IN | A | 1.1.1.1 |

To reduce the modification workload and the allocation workload, optionally, the A record of the NS may utilize the method of Extensive domain name directing to IP address. Because the matching range of the extensive domain name may be substantially large. Taking *.ns1.aaa.com as an example, 1.ns1.aaa.com, 2.ns1.aaa.com and 3.ns1.aaa.com, etc., may all fall within the matching range of *.ns1.aaa.com. Thus, for each A information in the A record, it may only need to ensure the authoritative domain name server in the NS record and corresponding to the A information to fall within the matching range of the A information. When performing a modification, the authoritative domain name server in the A record may not need to be modified. When a third authoritative domain name server is added to substitute the second authoritative domain name server, the IP address corresponding to the extensive domain name may be modified as the IP address of the third authoritative domain name server in the A record of the corresponding NS.

In the following, a specific example is used to describe the reduction of the modification workload and allocation workload using the Extensive domain name in detail.

For example, the first NS record registered in the top-level domain name server may be as following:

| aaa.com | 172800 IN | NS | 1.ns1.aaa.com  |
|---------|-----------|----|----------------|
| aaa.com | 172800 IN | NS | 1.ns2.aaa.com  |
| aaa.com | 172800 IN | NS | 1.ns3.aaa.com  |
| aaa.com | 172800 IN | NS | 1.ns4.aaa.com  |
| aaa.com | 172800 IN | NS | 1.ns5.aaa.com; | the A record of the first NS may be as following:

| 1.ns1.aaa.com | 172800 IN | A | 1.1.1.1  |
|---------------|-----------|---|----------|
| 1.ns2.aaa.com | 172800 IN | A | 2.2.2.2  |
| 1.ns3.aaa.com | 172800 IN | A | 3.3.3.3  |
| 1.ns4.aaa.com | 172800 IN | A | 4.4.4.4  |
| 1.ns5.aaa.com | 172800 IN | A | 5.5.5.5; |

While the first NS record allocated on the authoritative domain name server may be as following:

| aaa.com | 7200 IN | NS | 1.ns1.aaa.com  |
|---------|---------|----|----------------|
| aaa.com | 7200 IN | NS | 1.ns2.aaa.com  |
| aaa.com | 7200 IN | NS | 1.ns3.aaa.com  |
| aaa.com | 7200 IN | NS | 1.ns4.aaa.com  |
| aaa.com | 7200 IN | NS | 1.ns5.aaa.com; | and
the A record of the first NS may be as following:

| *.ns1.aaa.com | 7200 IN | A | 1.1.1.1 |
|---------------|---------|---|---------|
| *.ns2.aaa.com | 7200 IN | A | 2.2.2.2 |
| *.ns3.aaa.com | 7200 IN | A | 3.3.3.3 |
| *.ns4.aaa.com | 7200 IN | A | 4.4.4.4 |
| *.ns5.aaa.com | 7200 IN | A | 5.5.5.5 |

When the authoritative domain name server ns1 is under attacked, it may need to add an authoritative domain name server to substitute ns1. Thus, the first NS record allocated on the authoritative domain name server and the upper-level domain name server of the authoritative domain name server (i.e., top-level domain name server) may be modified respectively. It may only need to modify "1.ns1.aaa.com" as "2.ns1.aaa.com" or "3.ns1.aaa.com" or "4.ns1.aaa.com", etc. At the same time, the IP address of 1.1.1.1 in "*.ns1.aaa.com 7200 IN A 1.1.1.1" may be modified as 6.6.6.6. "2.ns1.aaa.com", "3.ns1.aaa.com" and "4.ns1.aaa.com" may all fall within the parsing range of the extensive domain name *.ns1.aaa.com. It can be seen that, in the present invention, the authoritative domain name server in the NS record may be changed to a lower level domain name of the authoritative domain name server. Further, in the A record, the authoritative domain name server may be changed to the extensive domain name of the original authoritative domain name server. Thus, the modification workload and the domain name allocation workload may be reduced. Accordingly, the working efficiency of the authoritative domain name server may be improved; and the domain name resolution efficiency may be increased.

It can be seen from the previous descriptions that the present invention may utilize the second NS record returned by the authoritative domain name server to update the first NS record. The second NS record may record the record of the authoritative domain name server working at the normal status; and may not expose the attacked authoritative domain name server. Accordingly, the domain name resolution request may all be guided to the authoritative domain name server working at the normal status in the second NS for the domain name resolution. Thus, the effect of the attacked domain name server to the domain name resolution may be avoided; and the efficiency of the domain name resolution may be reduced. Further, the TTL value in the second NS record may be able to update the TTL value in the first NS record. Thus, the current TTL value of 172800 mandatorily regulated by the top-level authority may not cause a long time issue to the DNS resolution.

Figure 4:
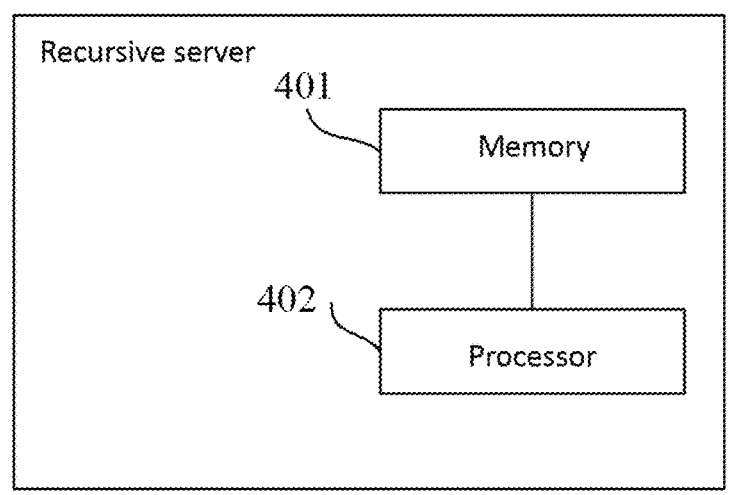
FIG. 4 illustrates an exemplary recursive server according to various disclosed embodiments.

Based on the similar technical concept, the present invention also provides a recursive server, as shown in FIG. 4, the recursive server may include:

a memory 401, configured to store program commands; and a processor 402, configured to call the program commands stored in the memory 401. Then, according to the obtained program commands, the processor 402 may perform: receiving the domain name search request message, wherein the domain name search request message may contain the domain name that is un-cached in the recursive server; determining a first authoritative domain name server according to the first NS record and the A record of the first NS corresponding to the domain name and sending a domain name search request message to the first authoritative domain name server; receiving by the first authoritative domain name server the A record of the domain name, a second NS record and an A record of the second NS returned, wherein the second NS record may record the authoritative domain name server that is used to parse the domain name and is at the normal working status; and substituting the first NS record with the second NS record and caching the A record of the second NS.

According to the obtained program commands, the processor 402 may also be configured to perform: determining a second authoritative domain name server according to the first NS record and the A record of the first NS corresponding to the domain name, wherein the second authoritative domain name server may be an authoritative domain name server of the domain name similar with the successfully parsed domain name recorded in the recursive server; and determining a first authoritative domain name server according to the first NS record and the A record of the first NS corresponding to the domain name. The second NS record may not include the second authoritative domain name server.

The present invention also provides a computer storage medium. The computer storage medium may store the computer executable instructions. The computer executable instructions may be used to enable the computer to execute the previously described steps performed by the recursive server.

Figure 5:
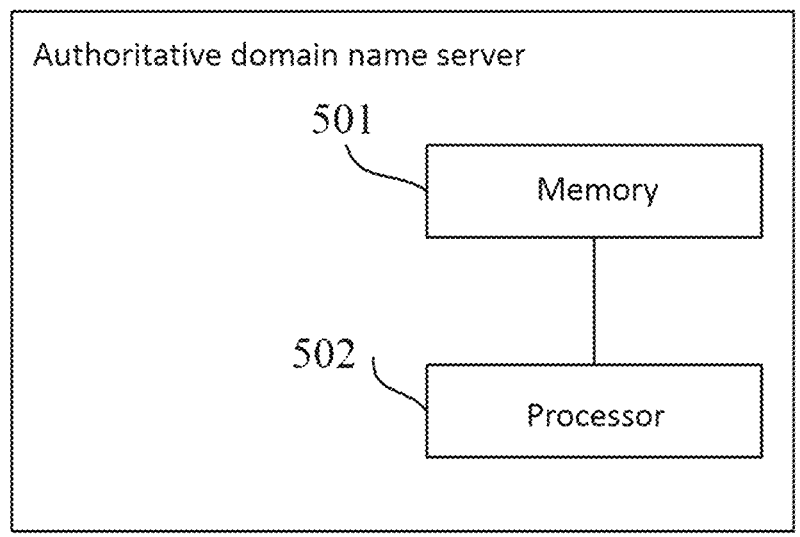
FIG. 5 illustrates an exemplary authoritative domain name server according to various disclosed embodiments.

The present invention also provides an authoritative domain name server. As shown in FIG. 5, the authoritative domain name server may include:

a memory 501, configured to store the program commands; and a processor 502, configured to call the program commands stored in the memory 501. According to the obtained program commands, the processor 502 may perform: receiving the domain name search request message sent from the recursive server, wherein the domain name search request message may contain domain name that is un-cached in the recursive server; determining by the recursive server a first authoritative domain name server according to the first NS record and the A record of the first NS record; and sending the A record of the domain name, a second NS record and the A record of the second NS to the recursive server. The second NS record may contain the information of the to-be-parsed domain name and the authoritative domain name server that is at the normal working condition.

According to the obtained program commands, the processor 502 may also be used to perform: deleting the information of the domain name server that is at the abnormal working status in the first NS record and the A record of the first NS, or substituting the information of the domain name server that is at the abnormal working status in the first NS record and the A record of the first NS with the information of a newly added domain name server that is used to parse the domain name.

The present invention also provides a computer storage medium. The computer storage medium may store the computer executable instruction. The computer executable instruction may be used to enable the computer to execute the previously described steps performed by the recursive server.

The present invention also provides a DNS anti-attacking system. The DNS anti-attacking system may include previously described recursive server configured to perform the previously described steps and the previous described authoritative domain name server configured to performed the previously described steps.

The person skilled in the art should understand that the embodiments of the present invention may provide methods, or computer program products. Thus, the embodiments of the present invention may be employed entirely by hardware, software, or a combination thereof. Further, the present invention may utilize a computer program product applied on one or more of a computer usable storage medium having computer-usable program code (including but not limited to disk storage, CD-ROM, or optical memory, etc.).

The present invention is described in accordance with the flowchart and/or block diagrams of the method, apparatus (systems) and computer program products. It should be understood that the computer program is able to realize each process and/or flow chart of the flowchart/or block diagrams and/or a combination of flowchart illustrations and/or block diagrams. These computer program instructions may be provided to a processor a general purpose computer, special purpose computer, embedded processor or other programmable data processing apparatus to produce a machine, such that the program executed by the processor of the computer or other programmable data processing apparatus may generate an apparatus for implementing the flow chart or more flow charts and/or block diagram block or blocks with specified functions.

These computer program commands may also be stored in readable storage of a computer that can direct a computer or other programmable data processing apparatus to function in a particular manner so as to allow the commands stored in the readable storage to produce an article including the command apparatus. The command apparatus may realize specified functions in in one or more flowcharts and/or one or more block diagrams.

These computer program commands may also be loaded onto a computer or other programmable data processing apparatus to enable a series of operational steps on the computer or other programmable apparatus to produce computer processable processes such that the commands executed on the computer or other programmable apparatus may provide steps used for realizing one or more flows and/or one or more block diagrams with specified functions.

The present invention is described with preferred embodiments, but those skilled in the art from the underlying inventive concept can make other modifications and variations to these embodiments. Therefore, the appended claims are intended to explain embodiments including the preferred embodiment as fall within the scope of the invention and all changes and modifications.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A domain name system (DNS) anti-attacking method, comprising:

receiving, by a recursive server, a domain name search request message, wherein the domain name search request message contains a domain name that is un-cached in the recursive server;

determining, by the recursive server, a second authoritative domain name server according to a first name server (NS) corresponding to the domain name and an address (A) record of the first NS corresponding to the domain name, wherein the second authoritative domain name server is an authoritative domain name server that has successfully parsed similar domain name as the domain name and is recorded in the recursive server;

determining, by the recursive server, a first authoritative domain name server according to a first NS record and the A record of the first NS corresponding to the domain name when the recursive server does not receive a message returned by the second authoritative domain name server, wherein the second NS record does not include the second authoritative domain name server;

determining, by the recursive server, the first authoritative domain name server according to a first name server (NS) the first NS record and an address (A) the A record of the first NS name server (NS) corresponding to the domain name and sending by the recursive server the domain name search request message to the first authoritative domain name server;

receiving, by the recursive server, the A record of the domain name, a second NS record and an A record of the second NS returned from the first authoritative domain name server, wherein the second NS record records an authoritative domain name server that is used to parse the domain name and is at a normal working status; and substituting, by the recursive server, the first NS record with the second NS record and caching the A record of the second NS.

2. The method according to claim 1, wherein substituting, by the recursive server, the first NS record with the second NS record and caching the A record of the second NS comprises:
 substituting, by the recursive server, the first NS record with the second NS record and caching the A record of the second NS, when the recursive server determines that the second NS record is different from the first NS record.

3. The method according to claim 1, wherein:
 the A record of the first NS and the A record of the second NS both utilize a form of Extensive domain name directing to IP address; and
 for each address (A) information in the A record of the first NS and the A record of the second NS, the authoritative domain name server corresponding to the A information in the NS record falls within a matching range of the A information.

4. The method according to claim 1, wherein the second NS record and the A record of the second NS are obtained by:
 deleting, by the first authoritative domain name server, information of a domain name server working at an abnormal status in the first NS record and an A record of the first NS; or
 substituting, by the first authoritative domain name server, the information of the domain name server working at the abnormal status in the first NS record and the A record of the first NS with information of a newly added domain name server that is used to parse the domain name.

5. The method according to claim 1, wherein:
 an upper level domain name server of the first authoritative domain name server is configured with the second NS record and the A record of the second NS.

6. A domain name system (DNS) anti-attacking method, comprising:
 receiving, by a first authoritative domain name server, a domain name search request message sent from a recursive server, wherein the domain name search request message contains a domain name that is un-cached in the recursive server; determining, by the recursive server, a second authoritative domain name server according to a first name server (NS) corresponding to the domain name and an address (A) record of the first NS corresponding to the domain name, wherein the second authoritative domain name server is an authoritative domain name server that has successfully parsed similar domain name as the domain name and is recorded in the recursive server;
 determining, by the recursive server, a first authoritative domain name server according to a first NS record and the A record of the first NS corresponding to the domain name when the recursive server does not receive a message returned by the second authoritative domain name server, wherein the second NS record does not include the second authoritative domain name server;
 determining, by the recursive server, the first authoritative domain name server according to a first name server (NS) the first NS record and an address (A) the A record of the first NS record; and
 sending the A record of the domain name, a second NS record and the A record of the second NS to the recursive server by the first authoritative domain name server, wherein the second NS record contains information of the authoritative domain name server that is used to parse the domain name and is at a normal working status.

7. The method according to claim 6, wherein the second NS record and the A record of the second NS are obtained by:
 deleting, by the first authoritative domain name server, the information of the domain name server working at an abnormal status in the first NS record and the A record of the first NS; or
 substituting, by the first authoritative domain name server, the information of the domain name server working at the abnormal status in the first NS record and the A record of the first NS with the information of a newly added domain name server that is used to parse the domain name.

8. The method according to claim 6, wherein:
 an upper level domain name server of the first authoritative domain name server is configured with the second NS record and the A record of the second NS.

9. A recursive sever, comprising:
 a memory, configured to store program instructions; and
 a processor, configured to call the program instructions stored in the memory and execute the obtained program instructions according to a domain name system (DNS) anti-attacking method, the method including:
 receiving, by a recursive server, a domain name search request message, wherein the domain name search request message contains a domain name that is un-cached in the recursive server;
 determining, by the recursive server, a second authoritative domain name server according to a first name server (NS) corresponding to the domain name and an address (A) record of the first NS corresponding to the domain name, wherein the second authoritative domain name server is an authoritative domain name server that has successfully parsed similar domain name as the domain name and is recorded in the recursive server;
 determining, by the recursive server, a first authoritative domain name server according to a first NS record and the A record of the first NS corresponding to the domain name when the recursive server does not receive a message returned by the second authoritative domain name server, wherein the second NS record does not include the second authoritative domain name server;
 determining, by the recursive server, the first authoritative domain name server according to a first name server (NS) the first NS record and an address (A) the A record of the first NS name server (NS) corresponding to the domain name and sending by the recursive server the domain name search request message to the first authoritative domain name server;
 receiving, by the recursive server, the A record of the domain name, a second NS record and an A record of the second NS returned from the first authoritative domain name server, wherein the second NS record records an authoritative domain name server that is used to parse the domain name and is at a normal working status; and
 substituting, by the recursive server, the first NS record with the second NS record and caching the A record of the second NS.

10. The server according to claim 9, wherein substituting, by the recursive server, the first NS record with the second NS record and caching the A record of the second NS comprises:

substituting, by the recursive server, the first NS record with the second NS record and caching the A record of the second NS, when the recursive server determines that the second NS record is different from the first NS record.

11. The server according to claim 9, wherein:
the A record of the first NS and the A record of the second NS both utilize a form of Extensive domain name directing to IP address; and
for each address (A) information in the A record of the first NS and the A record of the second NS, the authoritative domain name server corresponding to the A information in the NS record falls within a matching range of the A information.

12. The server according to claim 9, wherein the second NS record and the A record of the second NS are obtained by:
deleting, by the first authoritative domain name server, information of a domain name server working at an abnormal status in the first NS record and an A record of the first NS; or
substituting, by the first authoritative domain name server, the information of the domain name server working at the abnormal status in the first NS record and the A record of the first NS with information of a newly added domain name server that is used to parse the domain name.

13. The server according to claim 9, wherein: an upper level domain name server of the first authoritative domain name server is configured with the second NS record and the A record of the second NS.

14. A non-transitory computer-readable storage medium, wherein the computer storage medium stores computer executable instructions, the computer executable instructions causing a computer to perform the method according to claim 1.

15. A non-transitory computer-readable storage medium, wherein the computer storage medium stores the computer executable commands used to enable the computer to execute the method according to claim 6.

16. An DNS anti-attacking system, comprising the recursive server of claim 9.

\* \* \* \* \*